(12) United States Patent
Kornijenko

(10) Patent No.: US 7,032,979 B2
(45) Date of Patent: Apr. 25, 2006

(54) INTERNAL SPINNING SYSTEM

(76) Inventor: Alejandro Kornijenko, 7917 Roosevelt St., Taylor, MI (US) 48180

( * ) Notice: Subject to any disclaimer, the term of this patent is extended or adjusted under 35 U.S.C. 154(b) by 86 days.

(21) Appl. No.: 10/708,126

(22) Filed: Feb. 10, 2004

(65) Prior Publication Data

US 2005/0212346 A1    Sep. 29, 2005

(51) Int. Cl.
 *B60B 7/20*   (2006.01)
(52) U.S. Cl. ............................. 301/37.25; 301/37.109; 301/37.26
(58) Field of Classification Search ............. 301/37.25, 301/37.26, 37.101, 37.102, 37.106, 37.12; 40/587; 384/548, 569, 572
See application file for complete search history.

(56) References Cited

U.S. PATENT DOCUMENTS

| 2,997,344 | A  | * | 8/1961 | Whiteman ................ 301/37.25 |
| 6,848,751 | B1 | * | 2/2005 | Yuan ........................ 301/37.25 |
| 6,926,369 | B1 | * | 8/2005 | McCaster et al. ......... 301/37.25 |
| 2005/0062335 | A1 | * | 3/2005 | Odell ..................... 301/37.101 |
| 2005/0206218 | A1 | * | 9/2005 | Clifford et al. .......... 301/37.25 |

FOREIGN PATENT DOCUMENTS

JP         200132849 A  *  2/2001

* cited by examiner

*Primary Examiner*—Frantz F. Jules
(74) *Attorney, Agent, or Firm*—Artz & Artz, P.C.

(57) ABSTRACT

An internal spinning system includes an annular attachment section having a front portion and a flange extending outwardly from the front portion in a substantially perpendicular manner. At least one bearing is coupled to the flange and extend outwardly therefrom in a substantially parallel manner. A back portion opposes the front portion, wherein the back portion and the front portion define a plurality of bolt holes.

15 Claims, 3 Drawing Sheets

INTERNAL SPINNING SYSTEM

BACKGROUND OF INVENTION

The present invention relates generally to vehicle wheels, and more particularly, to an internal spinning system having a section that spins independently from the associated vehicle wheel.

Rotating hubcaps and wheel covers are well known in the automotive field. Various mechanisms have been employed to control the spinning of the hubcap or a section of the hubcap while the vehicle is moving and while the vehicle is at rest. There are currently two primary spinning wheel-section systems, and these systems typically include some form of spinning hubcap. The first is a system for maintaining the wheel-section generally stationary relative to the rotating vehicle wheel. The second is a system for maintaining the wheel-section in a rotating manner relative to a stationary vehicle wheel.

Current systems for maintaining a relatively stationary wheel-section typically employ various types of weighting mechanisms, thereby maintaining the wheel-section (e.g. hubcap) orientation regardless of reverse or forward rotation of the associated wheel.

Current systems for maintaining a spinning hubcap relative to a stationary wheel include a spinner on the external section of the hubcap attached to the wheel. The spinner is attached through either a bearing clutch device or a ratchet type system for controlling hubcap rotation.

These wheel systems are however susceptible to theft, as their removal merely requires removal of the attaching bolts or lugs. A further difficulty with current spinning hubcap systems is that they are highly susceptible to hazardous road environments, such as road debris that may jar the spinning section of the hubcap, excessive mud or dirt that may be difficult to clean off the spinning section of the hubcaps, or any sideswiping incidents with other vehicles or road obstacles. Still a further disadvantage is that current spinning hubcap systems are not compatible with various import and domestic vehicle tires.

The disadvantages associated with current wheel-section spinning systems have made it apparent that a new spinning system is needed. The new system should be theft resistant and compatible with most import and domestic vehicle wheel sizes and types, and should be substantially resistant to hazardous road environments. The present invention is directed to these ends.

SUMMARY OF INVENTION

In accordance with one aspect of the present invention, an internal spinning system includes a wheel having a rotor. The system further includes an annular attachment section having a first front portion, a flange extending outwardly from the first front portion and away from the wheel in a substantially perpendicular manner, and a first back portion opposing the front portion. The first back portion and the first front portion further define a plurality of bolt holes, whereby the annular attachment section bolts to the wheel.

Rotatably coupled to the attachment section is an annular spinning section. The spinning section includes a second front portion, a second back portion opposing the second front portion, a common external edge between the second front portion and the second back portion, the external edge comprising an ornamental spinning portion, and a substantially circular common internal edge.

A plurality of bearings are coupled to at least one of the annular attachment section or the annular spinning section, wherein the annular spinning section rotates as a function of rotation of the plurality of bearings.

One advantage of the present invention is that it may be incorporated in anti-theft wheels or rims, which are usually attached with a key or lock lug for anti-theft purposes related to the wheel. Therefore, the internal spinner may not be removed. An additional advantage of the present invention is that the wheel itself protects the internal spinner from road hazard environments, while the spinner protects the wheel like a brake dust cover. Still a further advantage is that the internal spinners may be attached to most import or domestic vehicles. Still further an advantage is that the present internal spinning system may be free wheel, forward spinning, or rearward spinning depending on the preference of the vehicle operator.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF DRAWINGS

In order that the invention may be well understood, there will now be described some embodiments thereof, given by way of example, reference being made to the accompanying drawings, in which.

DETAILED DESCRIPTION

The present invention is illustrated with respect to an internal spinning system 10 for a vehicle 12 particularly suited to the automotive field. The present invention is, however, applicable to various other uses that may require internal spinning systems, as will be understood by one skilled in the art.

Figure 1:
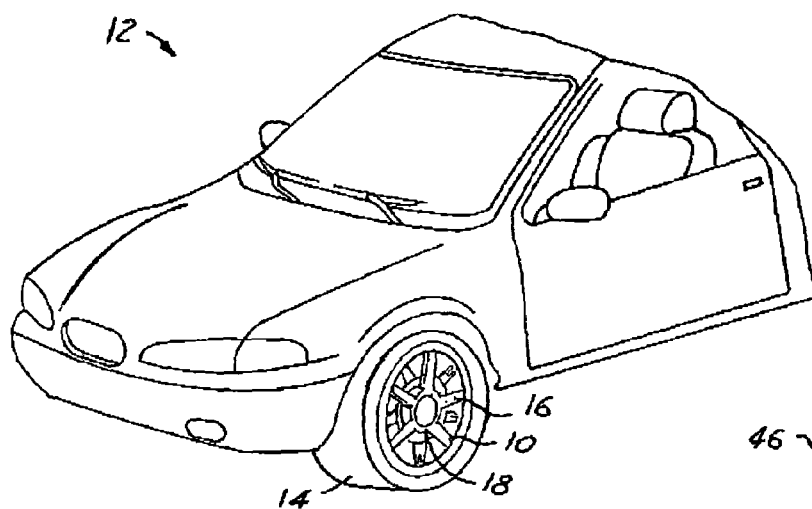
FIG. 1 illustrates a perspective view of a vehicle system including an internal spinning system in accordance with one embodiment of the present invention.
Figure 2:
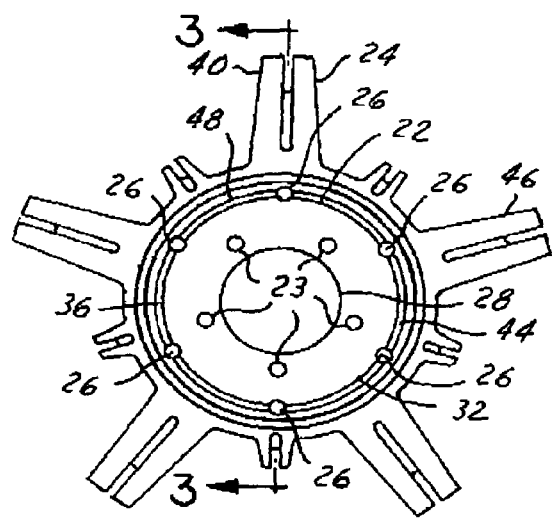
FIG. 2 illustrates a frontal view of the internal spinning system in accordance with FIG. 1.

Referring to FIG. 1, an internal spinning system 10 for a vehicle 12, in accordance with one embodiment of the present invention, is illustrated. The vehicle 12 includes four internal spinning systems, e.g. 10 including associated wheels, e.g. 14. The wheels 14, in one embodiment, include anti-theft rims 16 and rotors 18.

Each wheel 14 further includes a rim 16 substantially enclosing the internal spinning system 10 within the wheel 14, i.e. the internal spinning system 10 is internal with respect to the rim 16 and the wheel 14. The internal spinning system 10, for each wheel 14, is visible through openings, spokes, or arms of each rim 16, i.e. the external portion of the rim. In an alternate embodiment, the internal spinning system 10 is coupled to or molded into the rim 16.

Referring to FIGS. 2, 3, 5 and 6, the internal spinning system 10 is illustrated. One embodiment of the internal spinning system 10 includes an attachment section 22 for attaching the system 10 to the wheel 14 and a spinning section 24 for rotating in response to vehicle wheel rotation. The attachment section 22 is rotatably coupled to the spinning section 24 through a plurality of bearings 26. Alternate embodiments include a single bearing or ring bearing for rotational attachment.

The attachment section 22 is generally annular and adapted for coupling to the vehicle wheel 14. The embodied attachment section 22 includes an opening 28 for receiving a portion of the wheel 14. However, both the attachment section 22 and the spinning section 24 may alternately include solid surfaces and lack the aforementioned opening 28.

The attachment section 22 further includes a plurality of openings 23, here embodied as five, for bolting the attachment section 22 to the rotor 18 of the wheel 14.

The attachment section 22 includes a back portion 30 (first back portion), an opposing front portion 32 (first front portion), and a common edge 34. The front portion 32 includes a flange 36 extending outwardly therefrom and away from the wheel 14.

The common edge 34 of the attachment section 22 is embodied as having a thin cross section (e.g. 1/8 inch), which moves the wheel 14 outwardly while maintaining a necessary thread tension for the lug nuts 20, as required to hold the wheel 14 to the rotor 18.

The flange 36 includes a plurality of ports 38 for supporting the plurality of bearings 26 on, for example, roll pins 27. The flange 36 may be perpendicular to the attachment section 22 or angulated in relation thereto.

Alternate embodiments of the present invention include a roll rim on the flange having a roll surface for the bearings 26, whereby the bearings 26 are instead coupled to the spinning section 24, as will be further discussed later.

Alternate embodiments of the present invention include only the spinning section 24, coupled to or molded into the rim 16. However, the present invention is illustrated with respect to a spinning section 24 coupled to an attachment section 22, which is coupled to the rotor 18 or the rim 16.

The spinning section 24 is also annular in shape and includes a front portion 40 (second front portion), a back portion 42 (second back portion), an internal common edge 44 and an external common edge 45.

The present embodiment of the spinning section 24 includes ornamental designs 46 extending outwardly from the external common edge 45, whereby the designs 46 (ornamental spinning portion) may be changed depending on customer preference. In other words, a common external edge 45 is between the front portion 40 and the back portion 42. The external edge 45 includes an ornamental spinning portion 46. The spinning section may include polished aluminum, chrome or a powder coating, or any other coating known in the art. The inner common edge 44 includes, in one embodiment, a roll surface 48 such that the bearings 26 freely travel along the roll surface 48. In other words, the present invention includes a substantially circular common internal edge 44 having a roll surface 48. The common edge 44 may be coated with a seal to dampen noise occurring due to the contact of the attachment 22 and the spinning section 24. Various noise dampening materials include rubber or various plastics. Important to note is that such noise dampening materials may also serve to insulate and seal exposed components of the system 10.

Each of the bearings 26 includes a groove 50, such that the bearings 26 together define a roll support 51. The roll surface 48 of the spinning section 24 freely moves along the roll support 51. The bearings 26 further include a pin 52 for coupling the bearings 26 to the attachment section 22. The illustrated pin 52 extends from a base of each bearing 26, however numerous other bearing pin designs are embodied in the present invention, such as having the bearing 26 attached to the spinning section 24 through the pin 52 coupled to sections of the spinning section 24.

The internal spinning system 10 may allow for free spinning of the spinning section 24, or alternately, either the spinning section 24, the attachment section 22 may include rotation inhibitors 54, such that spinning motion of the spinning section 24 is limited to spinning in one direction. The rotation inhibitors 54 may include spring mechanisms such that when the bearings 26 roll over them they spring down, and subsequently spring up thereby preventing reversal of rotational motion. As was mentioned however, the present invention may include a free rotation of the spinning section 24 such that in response to rotational motion of the wheel 14 in either direction, the spinning section 24 will continue to spin after the wheel rotation has been halted.

Figure 3:
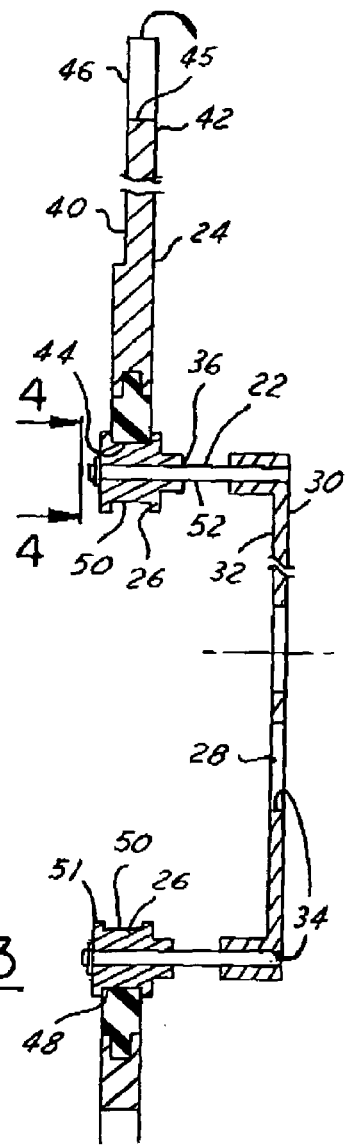
FIG. 3 illustrates a cross-sectional view of the system of FIG. 2 looking in the direction of line 3–3.
Figure 4:
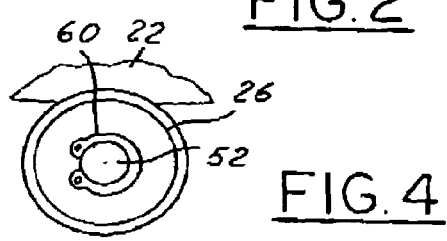
FIG. 4 illustrates an enlarged view of a bearing of FIG. 3 looking in the direction of line 4–4.
Figure 5:
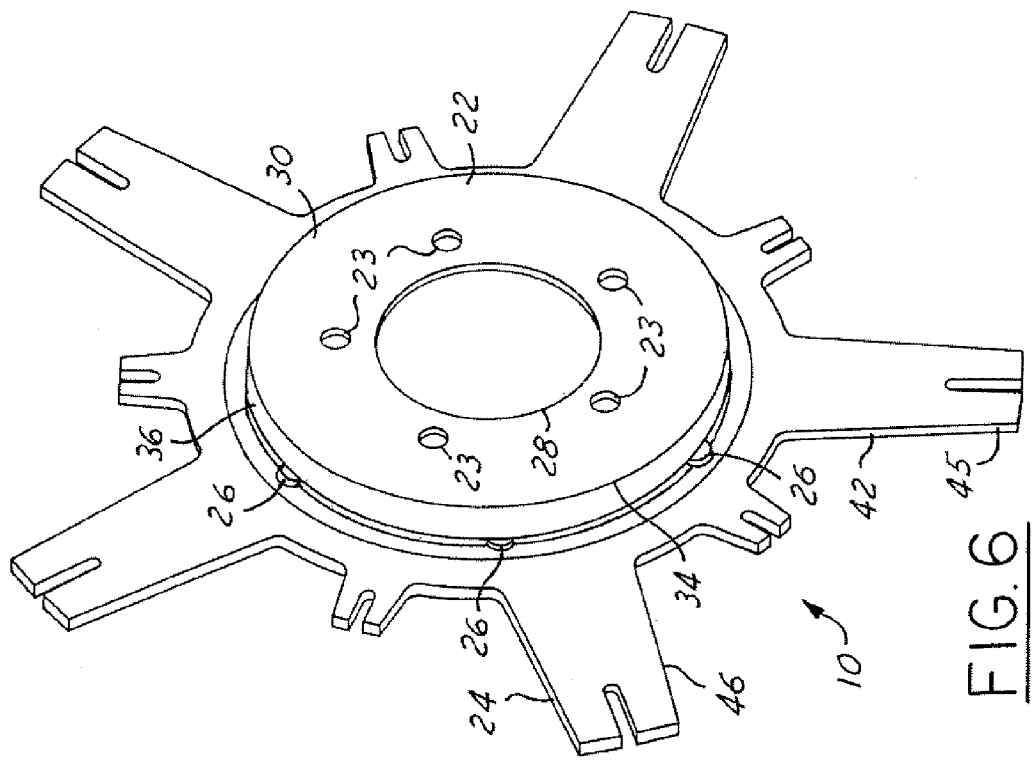
FIG. 5 illustrates a front perspective view of the spinning section and attachment section of the internal spinning system in accordance with FIG. 1.
Figure 6:
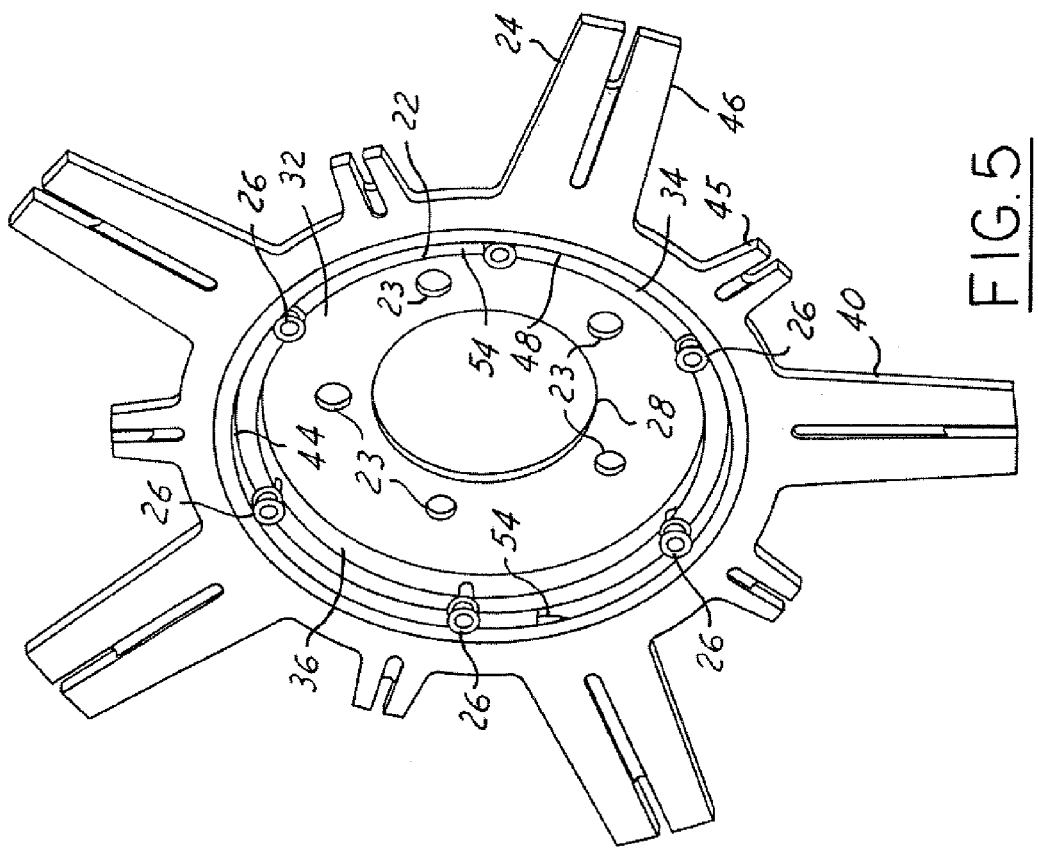
FIG. 6 illustrates the back perspective view of the spinning section and attachment section of the internal spinning system in accordance with FIG. 1.

Referring to FIG. 4, an enlarged view of the bearing 26 of FIG. 3, looking in the direction of line 4—4, is illustrated. In one embodiment of the present invention, the bearing 26 is rotatably coupled to the pin 52 and secured by a detachable washer 60. Numerous other bearing arrangements will be apparent to those skilled in the art.

Figure 7:
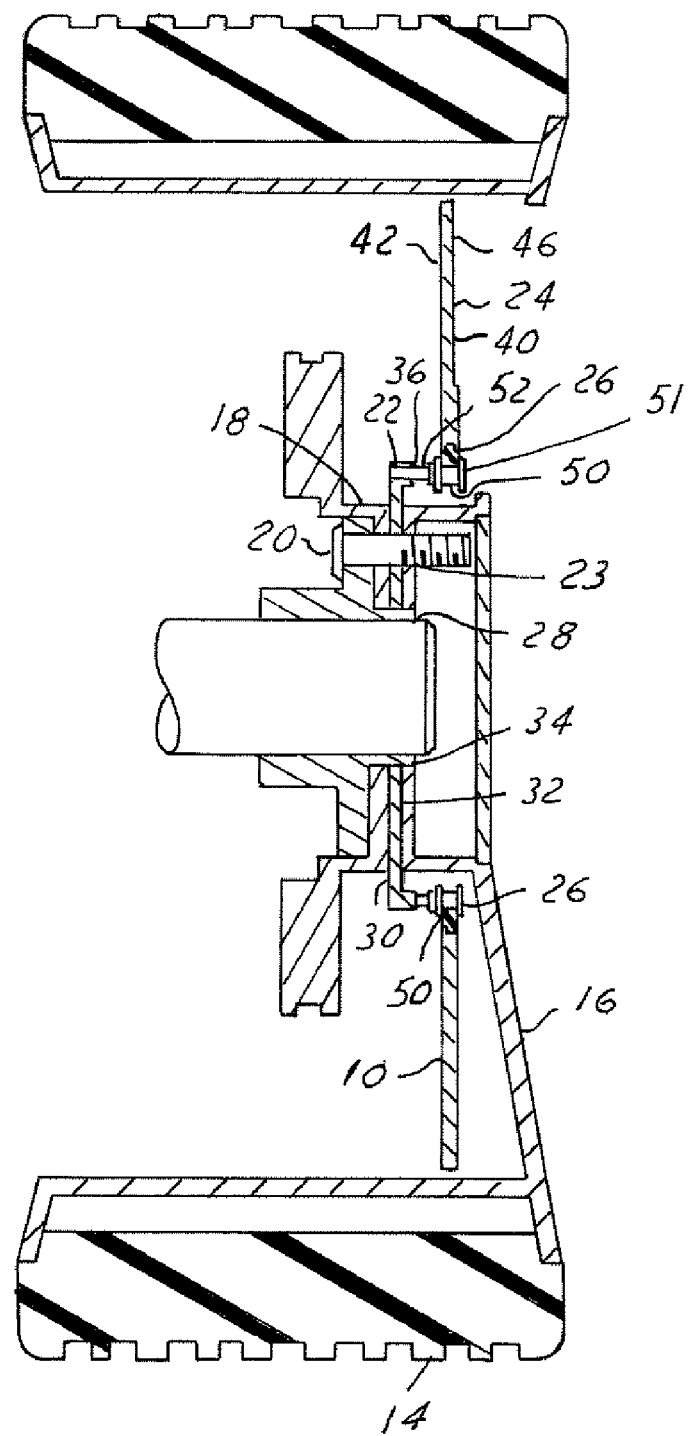
FIG. 7 illustrates a sectional view of a vehicle wheel including the internal spinning system in accordance with FIG. 1.

Referring to FIG. 7, a cutaway view of an internal spinning system 10 including a wheel 14, in accordance with FIG. 1, is illustrated. One skilled in the art will realize that typical vehicle wheels 14 include various wheel components, such as a rotor 18 that must be accommodated by a wheel system. Therefore, the internal spinning system 10 includes a wheel section opening 28 for receiving a portion of the wheel 14. The internal spinning system 10 is attached to the wheel 14 via lug nuts 20, such that the attachment section 22 of the internal spinning system 10 is attached to the wheel 14 to allow the spinning section 24 to spin as desired, i.e. clockwise, counterclockwise, or both.

In operation, the vehicle 12 travels either forward or rearward, whereby the spinning section 24 of the internal spinning system 10 rotates as a function of wheel rotation. As the vehicle comes to a halt, rotation continues for the spinning section 24 as long as momentum permits.

From the foregoing, it can be seen that there has been brought to the art a new and improved internal spinning system. It is to be understood that the preceding description of the preferred embodiment is merely illustrative of some of the many specific embodiments that represent applications of the principals of the present invention. Numerous other arrangements will be evident to those skilled in the art without departing from the scope of the invention as defined by the following claims.

The invention claimed is:

1. An attachment section for an internal spinning system comprising:
   a front portion;
   a flange extending outwardly from said front portion in a substantially perpendicular manner;
   at least one bearing rotatably coupled to said flange in a substantially parallel manner such that said at least one bearing defines a roll support surface substantially perpendicular to said front portion;

a plurality of ports for supporting a plurality of roll pins on which said at least one bearing is adapted to roll; and a back portion adapted to couple to a wheel, said back portion opposing said front portion, wherein said back portion and said front portion define a plurality of bolt holes.

2. The attachment section of claim 1, wherein said at least one bearing further comprises at least one groove substantially defining said roll support adapted to receive an opposing roll surface of a spinning section for an internal spinning system.

3. The attachment section of claim 1, wherein said at least one bearing is adapted to roll at least one of clockwise or counterclockwise or both clockwise and counterclockwise.

4. The attachment section of claim 1, wherein said at least one bearing comprises at least one of a plurality of bearings or a ring bearing.

5. An internal spinning system for a wheel including a rotor and a rim comprising:

an annular attachment section comprising a first front portion and a first back portion, a flange extending outwardly from said first front portion and away from the rotor in a substantially perpendicular manner, wherein said first front portion and said first back portion define an opening receiving at least a portion of the wheel, wherein said first front portion and said first back portion further define a plurality of bolt holes, whereby said annular attachment section bolts to the wheel;

an annular spinning section rotatably coupled to said attachment section, said spinning section comprising a second front portion, a second back portion opposing said second front portion, a common external edge between said second front portion and said second back portion, said external edge comprising an ornamental spinning portion, and a substantially circular common internal edge;

a plurality of bearings coupled to at least one of said annular attachment section or said annular spinning section, wherein said annular spinning section rotates as a function of rotation of said plurality of bearings such that said annular spinning section is visible through openings in the rim.

6. The system of claim 5, wherein said plurality of bearings are coupled to said flange and extend outwardly therefrom in a substantially parallel manner.

7. The system of claim 5, wherein said substantially circular common internal edge further comprising a roll surface.

8. The annular spinning section of claim 7, wherein said roll surface comprises a noise dampener covering at least a portion of said roll surface.

9. The annular spinning section of claim 7, wherein said noise dampener comprises rubber or plastic or a combination thereof.

10. The system of claim 5, wherein said wheel further comprises an antitheft rim, such that removal of said annular attachment section is inhibited.

11. The system of claim 5, wherein said attachment section further comprises a roll surface.

12. The system of claim 11, wherein said attachment section further comprises a noise dampener for said roll surface.

13. The system of claim 12, wherein said noise dampener comprises rubber or plastic or a combination thereof.

14. The system of claim 5, wherein said annular spinning section comprises polished aluminum, chrome or a powder coating.

15. The system of claim 5, wherein said annular attachment section comprises a substantially thin cross section.

* * * * *